United States Patent [19]

Wartelle

[11] Patent Number: 4,700,747
[45] Date of Patent: Oct. 20, 1987

[54] PROPORTIONAL HYDRAULIC DISTRIBUTOR

[75] Inventor: Claude Wartelle, Gouvieux, France

[73] Assignee: Centre Techniques des Industries Mecaniques, Senlis Cedex, France

[21] Appl. No.: 755,280

[22] Filed: Jul. 15, 1985

[30] Foreign Application Priority Data

Jul. 20, 1984 [FR] France ................... 84 11508

[51] Int. Cl.$^4$ .................. F16K 11/07; F16K 11/085
[52] U.S. Cl. ................. 137/625.23; 137/625.69; 137/625.3; 137/552.5; 91/35
[58] Field of Search ................. 137/625.13, 625.15, 137/625.16, 601, 552.5, 625.65, 625.23; 91/35

[56] References Cited

U.S. PATENT DOCUMENTS 3,437,098 4/1969 Stark et al. ................. 137/552.5 X

FOREIGN PATENT DOCUMENTS

1807864 5/1970 Fed. Rep. of Germany ... 137/552.5
2257830 8/1975 France .
2381219 9/1978 France .
2057637 4/1981 United Kingdom .

Primary Examiner—Arnold Rosenthal
Attorney, Agent, or Firm—Henry Sternberg; Bert J. Lewen

[57] ABSTRACT

The surface of a first fixed member (2) having at least one hydraulic-fluid passage (12, 18) is in contact with the surface of a second movable member (4) controlled by an actuating system (28, 30) and having at least one shut-off zone (6) and at least one recess (20) forming a zone exposing the said passage; at least one of the passages consists of a plurality of nozzles (12) which are pierced in the first member and are at a distance from one another and which are arranged on at least one track (14) directed parallel to the relative movement of the two members; the said actuating system is a step-by-step system driving the movable member in increments of a value d; the recesses (20) and the shut-off zones (6) on the second member are such that the said nozzles are exposed or shut off in turn at each advance of the movable member (4) by an increment d.

10 Claims, 18 Drawing Figures

FIG_1

FIG_2

FIG_3

FIG_4

FIG_5

FIG_6

FIG_8

FIG_7

FIG_9

FIG_10

FIG_11

FIG_12

FIG_14

FIG_13

FIG_15

FIG_16

FIG_17

FIG_18

PROPORTIONAL HYDRAULIC DISTRIBUTOR

The present invention relates to a proportional hydraulic distributor and is aimed more particularly at a distributor of the numerically controlled servo-valve type.

Hydraulic distributors, especially those executing "all or nothing" switching operations, are well known and are in widespread use, for example for controlling single-acting or double-acting jacks.

In the most common type, the distributor comprises a fixed body perforated with several hydraulic-fluid passages (for example, high-pressure, low-pressure and service passages) and a movable distributor member (for example, a cylindrical slide which slides in the body), this movable member possessing on its surface zones shutting off the fluid passages, and having recesses forming zones exposing these passages. Depending on its position, the slide puts in communication or isolates some passages or others. Usually, the movements of the slide towards one or other of its end positions are controlled by an actuator (mechanical, electrical or hydraulic). However, where large high-power distributors are concerned, a small electrical distributor forming a pilot stage for the power stage must be provided.

In many uses, there is a need for proportional distributors, that is to say those ensuring a progressive variation in the flow rate or pressure between the two end positions of the slide, in contrast to "all or nothing" distributors.

Despite a high degree of accuracy in the machining of the edges of the slide, it is very difficult, in a proportional distributor, to achieve good linearity between the actuator control signal (for example, the current energizing an electromagnet controlling the slide) and the hydraulic output quantity. Moreover, the electromagnet is large in size and costly.

To obtain better performances (in terms of gain and linearity), proportional distributors, or servo-valves, possessing an electro-hydraulic pilot stage have been produced for the past few years. In these distributors, the power stage still consists of a cylindrical slide, and the pilot stage usually consists of a hydraulic Wheatstone bridge incorporating nozzles, leaks from which are adjusted by means of a movable blade controlled by an electrical actuator (motor or electromagnet).

However, these devices are very costly, and consequently they have hitherto been reserved for specialized industries, such as aeronautics. Moreover, the nozzle blade systems are very sensitive to pollution of the fluid.

Because of the development of machine automation, and to benefit from the advantages provided by microelectronics in numerical controls, there is now a need for proportional servo-valves of industrial type, which have high performances and are inexpensive.

The aim of the invention is to solve this problem by means of a servo-valve which does not require a pilot stage and in which the distributor member does not need to be machined as accurately as the slide of known proportional distributors.

The subject of the invention is a proportional hydraulic distributor comprising a first and a second member, one of which is a fixed body and the other of which is a movable distributor member having a surface in contact with a corresponding surface of the fixed body, the first member possessing at least one hydraulic-fluid passage opening onto its surface, the second member possessing on its surface at least one zone shutting off the said passage and at least one recess forming a zone exposing the said orifice, and the said movable member being controlled by an actuating system. According to the invention, at least one of the above-mentioned passages consists of a plurality of elementary orifices, or nozzles, which are pierced in the first member and are at a distance from one another and the total cross-section of which forms the cross-section of the said passage; the said nozzles are arranged on at least one track directed parallel to the relative movement of the two members, each track possessing at least one nozzle; the said actuating system is a step-by-step system driving the movable member in increments; the recesses and the shut-off zones provided on the second member are such that the said nozzles are exposed in turn at each advance of the movable member by one increment.

The invention therefore involves shutting off (or exposing) in succession a plurality of fine calibrated orifices, or nozzles, and no longer, as in conventional proportional distributors with a slide, progressively varying by means of an edge of the slide the passage cross-section of a single general orifice of large cross-section for the passage of the hydraulic fluid.

In conventional distributors, the variation in cross-section is continuous (but often inaccurate in relation to the input signal), whereas, in the present distributor, the variation in cross-section is discontinuous (for example, by 50 or 100 increments, if desired), but it is always completely specific and exact as a function of the input signal.

In a distributor according to the invention, the movement of the movable member in relation to the fixed body can be a linear movement or preferably a rotary movement.

Advantageously, the movable member consists of a cylinder forming a rotary slide, in which the above-mentioned recesses are machined and which rotates in a cylindrical bore of the body in which the nozzles are pierced. A stepping motor or a similar system drives the rotary slide directly in increments.

According to a simple embodiment, all the nozzles are of identical cross-section and are aligned on a single track parallel to the relative movement of the two members.

According to another embodiment, nozzles of increasing cross-section are provided on several tracks, and each track can possess a nozzle of each cross-section or preferably several nozzles of the same cross-section at a distance of one step from one another on each track.

The increasing cross-sections of the nozzles are selected in the ratio a, 2a, 4a, 8a, etc., a being the minimum passage area for the fluid. Likewise, the recesses made in the movable distributor member have, in the direction of movement of the said member, extensions in the ratio d, 2d, 4d, 8d, etc., d being the increment of movement of the movable member, and are arranged along parallel tracks corresponding to the tracks along which the nozzles are pierced in the other member.

The invention will be understood better from a reading of the following detailed description and from an examination of the attached drawings which illustrate several embodiments of the invention as non-limiting examples.

Figures 1, 2:
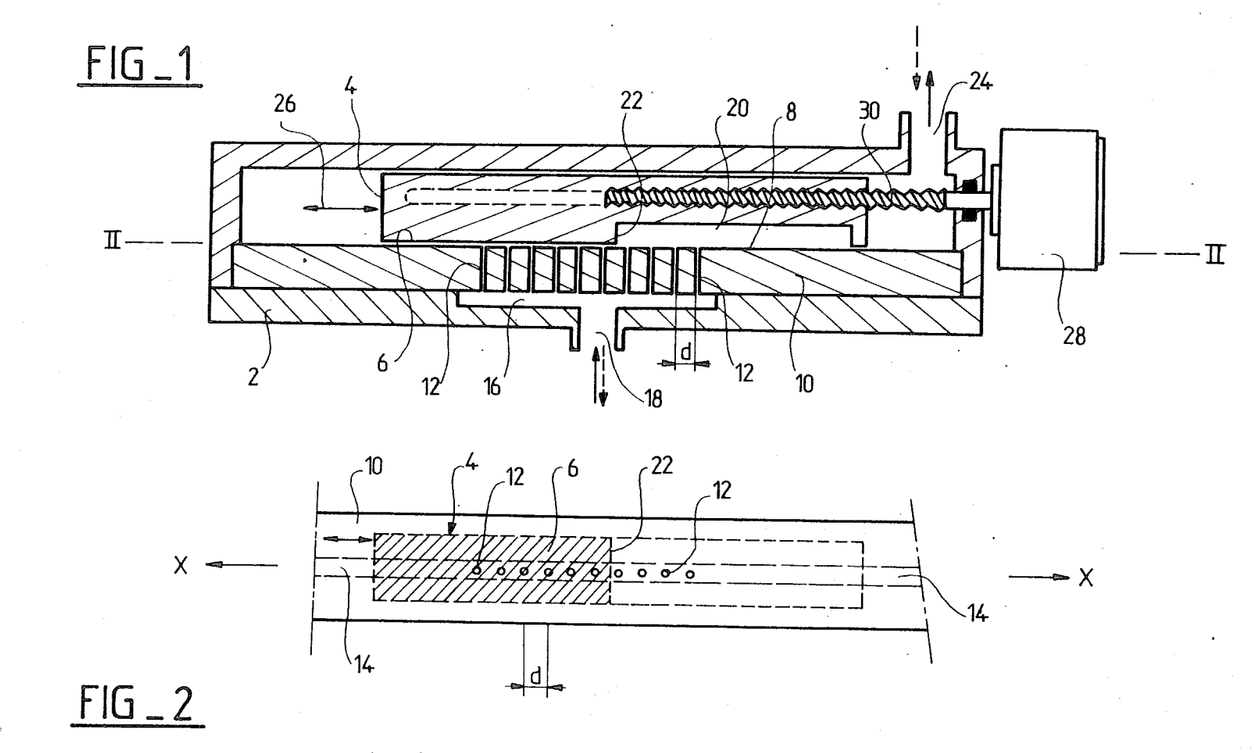
FIG. 1 is a sectional view of a simplified embodiment of the invention.
FIG. 2 is a partial view of the distributor in the plane II—II of FIG. 1.

FIG. 1 illustrates a simple embodiment, in which the movable member executes a linear movement, to make it easy to understand the invention, but in practice, as will be seen later, it is preferable to make the movable member execute a rotary movement.

The distributor of FIG. 1 comprises a fixed body 2 and a movable member, or sliding slide 4, which has a plane surface 6 in contact with a plane surface 8 of a plate 10, called a "nozzle plate", forming part of the fixed body 2. The plate 10 is perforated with a plurality (10 in the example of FIG. 1) of calibrated orifices or nozzles 12 of cross-section a, which are at an equal distance from one another at an interval d and which are aligned along a line or track 14 (see FIG. 2). The nozzles 12 communicate, by means of a groove 16, made in the body 2, with an inlet (or outlet) passage 18 for the fluid in the distributor.

The sliding slide 4 performs the function of a screen in relation to the nozzles 12.

The surface 6 of the slide forms a zone shutting off the nozzles, whilst a recess 20 connected to the surface 6 by means of an edge 22 forms a zone exposing the nozzles, allowing the fluid which has passed through the exposed nozzles to flow towards an outlet (or inlet) passage 24 for conveying the fluid outside the distributor.

The slide 4 is controlled so as to move linearly in one direction and the other according to the arrow 26 by means of a step-by-step actuator which can comprise, for example, an electric motor 28 driving an endless screw 30 which taps into the slide 4.

In response to each signal received, the actuator 28, 30 shifts the slide 4 by an increment d corresponding to the distance d between the nozzles.

During operation, during each movement of the slide 4 by one increment d, the edge 22 of the slide exposes a new nozzle 12 in turn, with the result that the passage cross-section for the fluid increases discontinuously according to the progression 0, a, 2a, 3a, . . . , 10a (or decreases when the slide 4 moves in the opposite direction), but in a perfectly linear manner in relation to the input signals sent to the motor 28 of the actuator.

The simple embodiment illustrated in FIGS. 1 and 2 requires only a single edge 22 exposing or shutting off the nozzles to be machined on the slide 4, but if a finer resolution were desired (for example, 1 or 2%), it would be necessary to pierce a large number of nozzles (for example, 100 or 50). Furthermore, to construct a so-called 5/2 distributor (with five orifices and two end positions), such as those needed to control a double-acting jack, four systems identical to that of FIG. 1 would have to be associated with one another.

Consequently, the following description will refer to proportional distributors making it possible to achieve a finer resolution, without the need for piercing a large number of nozzles, and allowing 3/2 or 5/2 distributors to be produced.

Figure 3:
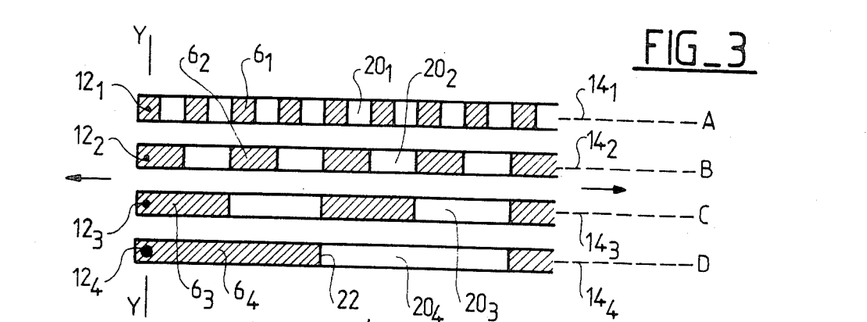
FIG. 3 is a partial plan view of a second embodiment of the distributor in the plane of contact between the fixed and movable members.

FIG. 3 is a view, similar to that of FIG. 2, of a distributor having a slide 4 sliding on the plane surface 8 of a nozzle plate 10.

This plate is perforated with a plurality n of orifices $12_1$, $12_2$, $12_3$, $12_4$ at a distance from one another and preferably aligned on an axis Y-Y perpendicular to the axis of movement X—X of the slide, each orifice being pierced on one of n parallel tracks $14_1$, $14_2$, $14_3$, $14_4$ similar to the track 14 of FIG. 2.

The four orifices have increasing cross-sections a, 2a, 4a, 8a.

Figure 4:
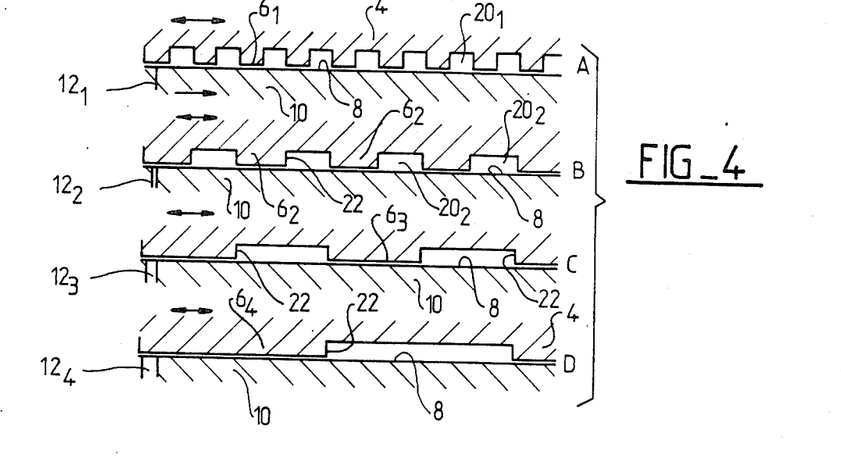
FIGS. 4A, 4B, 4C and 4D are sectional views in planes passing through the various tracks of the distributor of FIG. 3.

FIG. 4 is a partial sectional view similar to that of FIG. 1, but showing only the nozzle plate 10 and the sliding slide 4, the four views A, B, C, D of FIG. 4 being taken in parallel planes passing respectively through the tracks $14_1$, $14_2$, $14_3$, $14_4$ containing the nozzles $12_1$, $12_2$, $12_3$, $12_4$.

Along the track $14_1$ (FIG. 4A), the sliding slide 4 has shut-off zones $6_1$ which are in contact with the plane surface 8 of the nozzle plate and extend over a length d (equal to the increment of movement of the slide) and which are separated by recesses 20 of the same length. These recesses and these shut-off zones (which are also shown in FIG. 3) interact with the first orifice $12_1$.

Along the track $14_2$ (FIG. 4B), the recesses $20_2$ and the shut-off zones $6_2$ of the slide, which interact with the second orifice $12_2$, have a length of $2d$.

In a similar way, along the tracks $14_3$ and $14_4$ (FIGS. 4C and 4D) the recesses $20_3$, $20_4$ and the shut-off zone $6_3$, $6_4$ have a length of $4d$ and $8d$.

The table set out below indicates which nozzles are open (O) or closed (C) during each movement of the slide by one increment d.

| | | | | | | | | | | | | |
|---|---|---|---|---|---|---|---|---|---|---|---|---|
| $12_1$ (a) | F | O | F | O | F | O | F | O | F | O | F-- | — | O |
| $12_2$ (2a) | F | F | O | O | F | F | O | O | F | F | O- | — | O |
| $12_3$ (4a) | F | F | F | F | O | O | O | O | F | F | F- | — | O |
| $12_4$ (8a) | F | F | F | F | F | F | F | F | O | O | O- | — | — |
| Total cross-section | O | a | 2a | 3a | 4a | 5a | 6a | 7a | 8a | 9a | 10a | | 15a |

It also shows the progression a, 2a, 3a, etc. of the total passage cross-section for the fluid.

This embodiment therefore makes it possible to achieve a finer resolution with a number of nozzles (for example, 16 increments with only 4 nozzles, as shown in FIGS. 3 and 4, or 64 increments with only 6 nozzles) which is much less than in the embodiment of FIG. 1.

However, in this embodiment, a large number of separating edges 22 has to be machined in the slide between the shut-off zones and the recesses of the slide (for example, 30 edges for 16 increments in the example illustrated), and this is not very economical.

Figure 5:
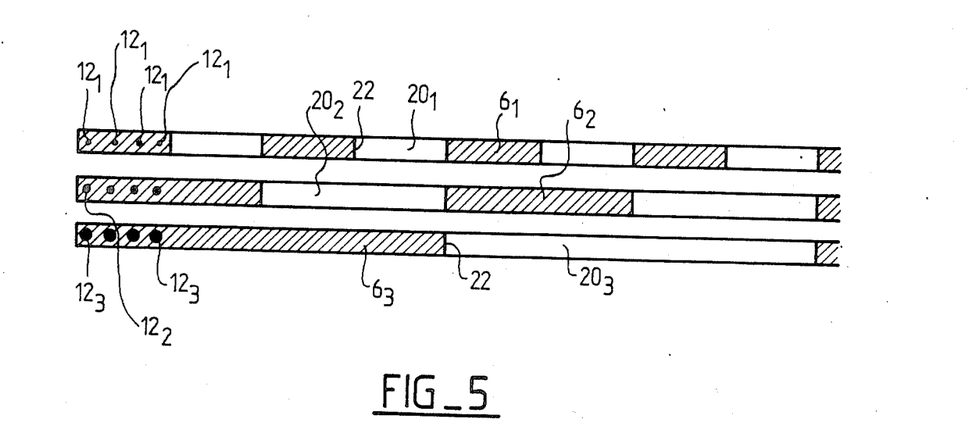
FIG. 5 is a view, similar to that of FIG. 3, of a third embodiment of the distributor.

FIG. 5 illustrates a plan view (similar to those of FIGS. 2 and 3) of a third embodiment which is a combination of the two preceding embodiments.

This embodiment likewise possesses n parallel tracks $14_1$, $14_2$, $14_3$, etc. (as in FIGS. 3 and 4), with orifices of increasing cross-sections a, 2a, 4a, etc. from one track to the other, but each track has a plurality m (for example, four) of orifices of identical cross-section which are aligned along the corresponding track and at a distance from one another at an interval d (as in FIGS. 1 and 2) in the direction of movement of the slide.

The slide likewise possesses, opposite each track, shut-off zones $6_1$, $6_2$, $6_3$ and recesses $20_1$, $20_2$, $20_3$ which respectively have the length 4d, 8d, 16d and which are separated by edges 22.

When the slide 4 moves by one increment of value d, successive fluid passage areas are obtained on the first track, and these follow the sequence 0, a, 2a, 3a, 4a, 3a, 2a, a, 0, etc., and on the second track the sequences 0, 0, 0, 0, 2a, 4a, 6a, 8a, etc.

The total sum of the areas exposed on the three tracks follows a sequence corresponding to an arithmetic progression of ratio a, as in the preceding figures.

In the embodiment illustrated in FIG. 5, where there are n=three tracks and m=four nozzles per track, a progression of m x $(2^n-1)=28$ increments is obtained. This makes it necessary to machine n×m=12 nozzles and 2 $(2^n-1)=14$ edges, such as the edges 22 separating the recesses from the shut-off zones, thus simplifying the machining of the slide in comparison with the preceding embodiments.

Figure 13:
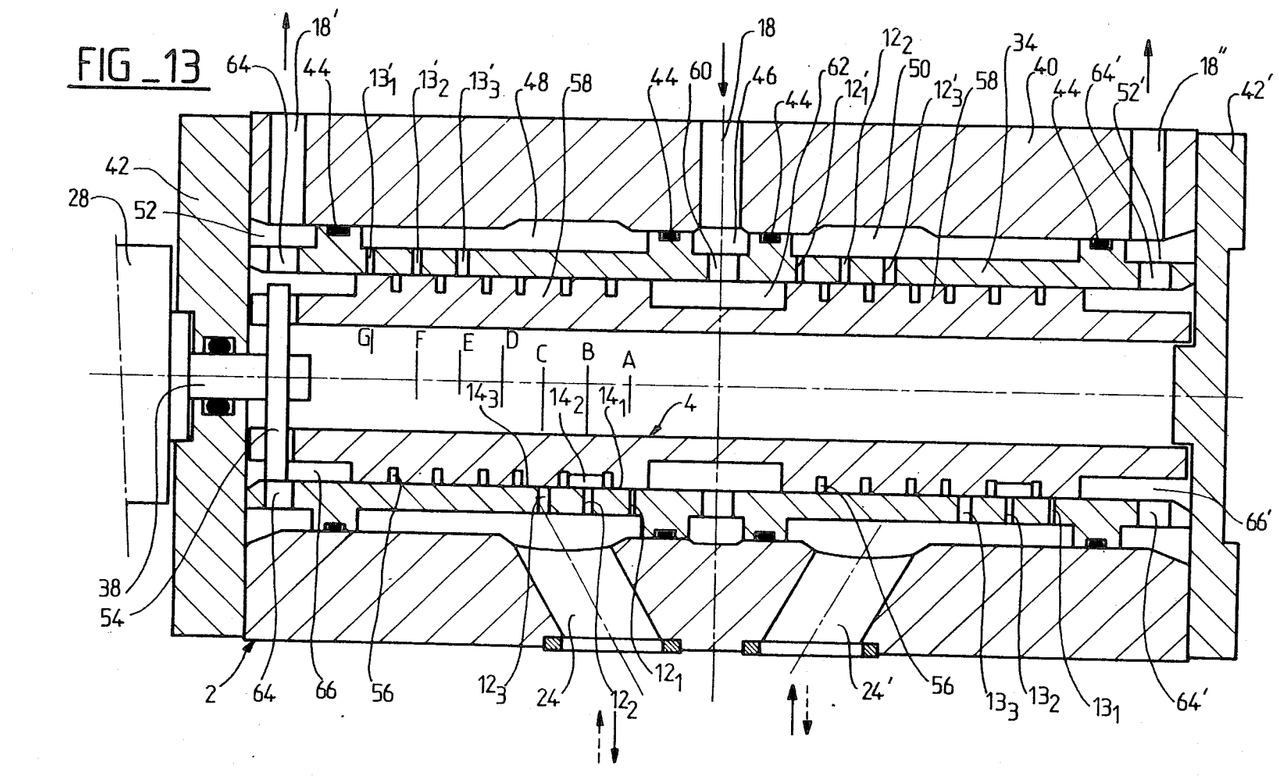
FIG. 13 is a sectional view of a 5/2 distributor with a cylindrical rotary slide.

With n=3 tracks and m=6 nozzles per track, that is to say 18 nozzles to be pierced, 42 positions are obtained, again with only 14 edges to be machined in the slide (as will be seen in relation to FIG. 13).

To make the description clearer, the only distributors described and illustrated are those in which the movements of the slide are linear and in which the interacting surfaces 6 and 8 of the slide 4 and the nozzle plate 10 are plane surfaces. However, in these simple solutions, the slide is not balanced hydrostatically, and it is therefore necessary to exert an additional laying or retaining force on it to ensure a seal between the two members, thus making it necessary to use a relatively powerful actuator.

Figure 6:
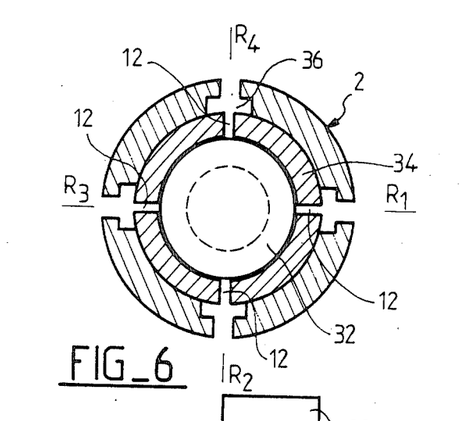
FIG. 6 is a sectional view in a radial plane of a distributor with a sliding cylindrical slide.

According to an alternative form (FIG. 6), it is possible to use a sliding slide 32 which is cylindrical and not plane and which slides in a tubular sleeve 34 accommodated within the body 2 of the distributor. The nozzles 12 are pierced in the sleeve 34 at 3 or preferably 4 radii $R_1$, $R_2$, $R_3$, $R_4$ and communicate with grooves 36 made in the body 2 and connected to one another for the passage of the fluid. Because of the angular offset of the various nozzles, at least partial balancing of the hydrostatic forces is achieved.

However, the control of the step-by-step linear movement of the movable slide makes it necessary to insert a movement converting the mechanism (for example, the screw/nut system 30 of FIG. 1) between a rotary stepping motor and the slide.

Consequently, in the preferred embodiments of the invention, a (plane or cylindrical) rotary movable distributor member controlled directly in terms of rotation by a rotary stepping motor is selected. The preceding FIGS. 2, 3, 4 and 5 can be considered as laid-out views of the opposing interacting surfaces 6 and 8, when these surfaces move in rotation relative to one another.

Figures 7, 9, 10:
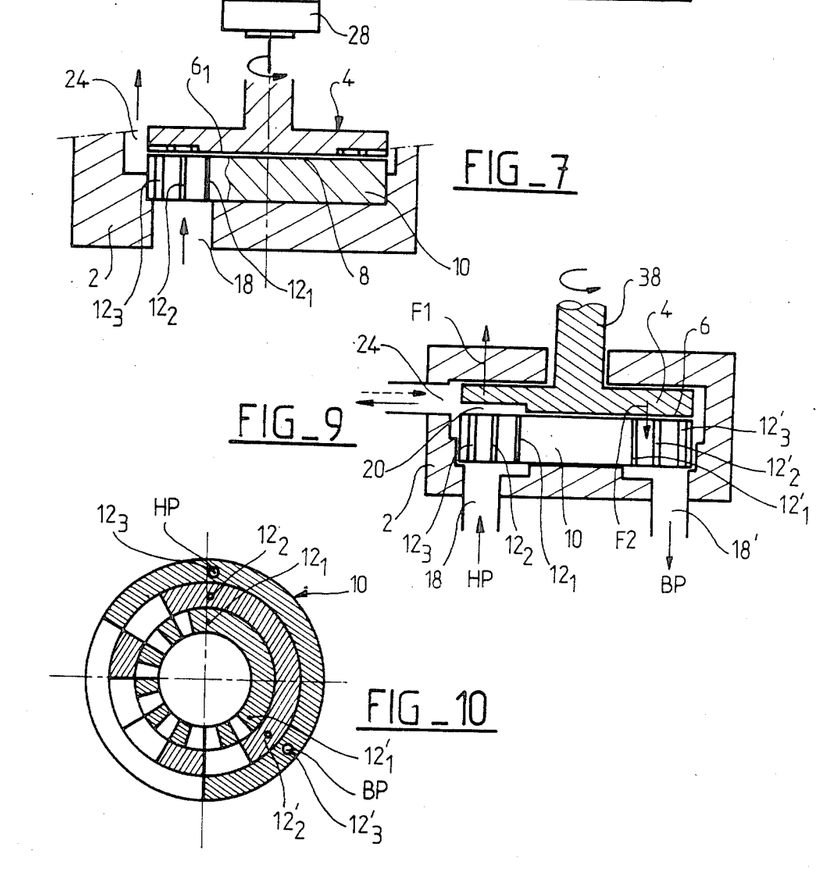
FIGS. 7 and 8 are respectively a view in diametral section and a plan view of a distributor with a plane rotary slide.
FIGS. 9 and 10 are respectively a view in diametral section and a plan view of a 3/2 distributor with a plane rotary slide.
Figure 8:
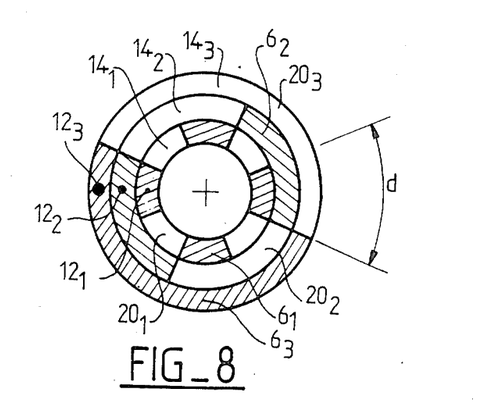

FIGS. 7 and 8 illustrate a plane distributor with a rotary movement, in which nozzles $12_1$, $12_2$, $12_3$ of cross-section a, 2a, 4a are pierced in a circular nozzle plate 10 integral with the distributor body 2. The movable distributor member consists of a rotary plate 4 which is driven directly by a rotary step-by-step actuator 28 and the active face of which is in contact with the plane face 8 of the nozzle plate 10. This active face has recesses $20_1$, $20_2$, $20_3$ and shut-off zones $6_1$, $6_2$, $6_3$ arranged on circular sectors corresponding to circular tracks $14_1$, $14_2$, $14_3$. The embodiment of FIGS. 7 and 8 therefore corresponds exactly to the diagrams of FIGS. 3 and 4 (limited to three tracks instead of four), but with circular rather than rectilinear tracks $14_1$, $14_2$, $14_3$.

The mode of operation emerges to a sufficient extent from the foregoing for it merely to be said that, at each advance of the rotary plate 4 by an angular increment d, the passage cross-section for the fluid varies according to the progression a, 2a, 3a, 4a, etc.

Proportional distributors with a single channel, making it possible to adjust a fluid passage cross-section between a single inlet orifice 18 and a single outlet orifice 24, were described and illustrated above (FIGS. 1 and 7).

To produce a three-way distributor, called a "3/2" distributor, having three orifices (high-pressure, low-pressure and service), for example for controlling a single-acting jack, two distributors identical to those just described would have to be coupled mechanically.

According to an advantageous embodiment, such a 3/2 distributor similar to that of FIGS. 7 and 8 can be produced, though with a single circular nozzle plate 10 and a single rotary distributor plate 4, as shown in FIG. 9.

The fixed body 2 has an inlet orifice (high-pressure) 18, an outlet orifice (low-pressure) 18' and a service orifice 24. The nozzle plate 10 is perforated with groups of nozzles $12_1$, $12_2$, $12_3$ and $12'_1$, $12'_2$, $12'_3$ communicating respectively with the orifices 18 and 18'.

The shut-off zones 6 and the recesses 20 provided in the rotary plate 4 are such that the nozzles of one group are exposed in succession, whilst the nozzles of the other group are shut off, and vice versa.

In the embodiment of FIG. 9, in which the two groups of nozzles are pierced in one and the same diameter of the plate 10, only an angular deflection of 180° (instead of 360°) of the rotary plate 4 can be used, and this can result in insufficient fineness of resolution.

Preferably, as illustrated in FIG. 10, the two groups of nozzles are arranged on two radii of the nozzle plate 10 which are offset at approximately 120° relative to one another, and the shut-off zones and recesses of the rotary distributor plate 4 are positioned in such a way that the shut-off zones shut off on some occasions the high-pressure orifices ($12_1$, $12_2$, $12_3$) and on other occasions the low-pressure orifices ($12'_1$, $12'_2$, $12'_3$), always with thCe increases 2a, 3a, etc. in the fluid passage cross-section at each advance of one step. It is thus possible to utilize an angular deflection of 240° of the rotary plate, thus improving the possible resolution.

To simplify the drawings, FIGS. 7 to 10 only show a single nozzle on each circular track, but it is possible, of course, to provide several nozzles of the same cross-section on each track, as described in relation to FIG. 5.

Figure 11:
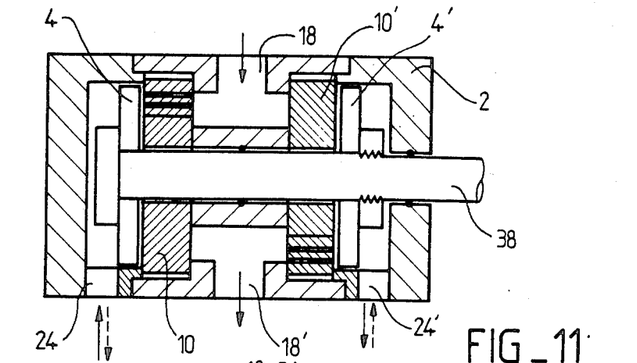
FIG. 11 is a view in diametral section of a 5/2 distributor with two plane rotary slides coupled mechanically.

The invention also makes it possible to produce a so-called 5/2 distributor, when two distributors such as that of FIG. 10 are coupled mechanically in the way shown in FIG. 11.

The body 2 of the distributor has an inlet orifice (high-pressure) 18, an outlet orifice (low-pressure) 18', a first service orifice 24 and a second service orifice 24'. Such a distributor is designed for the proportional control of a double-acting jack connected to the orifices 24, 24'.

The distributor comprises, integral with the body 2, two nozzle plates 10, 10' (of the type shown in FIG. 9) and two rotary distributor plates 4, 4' keyed on a common drive shaft 38 in engagement with the stepping motor (not shown). The mode of operation emerges to a sufficient extent from what was said in relation to the preceding figures for it merely to be stated that the arrangement of two distributor plates 4 and 4' coupled on one and the same shaft 38 ensures at least partial balancing of the resultant hydrostatic forces on the distributor plates, these forces being proportional to the pressure differences on the two faces of the plate and to the surface of the shut-off nozzles.

Thus, returning to the example of FIG. 9 (with a single distributor plate), if it is assumed for the sake of simplification that all the nozzles are shut off by the shut-off zones 6, that the high pressure has a value p, that the pressure prevailing in the operating circuit 24 has a value $p_1$ and that the total area of the orifices is A, the distributor plate 4 will be subjected to a first hydrostatic force $F_1$ proportional to $A \times (p - p_1)$ and to a second opposing force $F_2$ proportional to $A \times p_1$. Consequently, there is at least partial balancing of forces (and this balancing can be total if $p_1 = \frac{1}{2}p$), but the two forces $F_1$, $F_2$ generate a torque. Torque balancing is therefore not achieved.

However, referring to FIG. 11, it will be seen that, because the two distributor plates 4, 4' are coupled mechanically in symmetrical positions, at least partial torque balancing is likewise obtained on the two rigidly connected distributor plates as a whole, since the torques have opposite signs.

Of course, in FIG. 11, the two plates 4, 4' could be arranged between the nozzle plates 10, 10'.

Likewise, in FIG. 11, the high-pressure and low-pressure orifices (18,18') could be reversed with the service orifices 24, 24'. However, in this case, it is easy to see that on each distributor plate there would be partial (or total) torque balancing, but not force balancing (in fact, the two forces $F_1$, $F_2$ mentioned above are in the same direction on one and the same distributor plate).

A distributor with two rotary distributor plates and two nozzle plates, of which the nozzles of cross-section a, 2a, 4a are distributed on three tracks (as in FIG. 11), but having four nozzles of identical cross-section on each track, makes it possible to obtain 28 position settings in an arithmetic progression. If a total fluid passage cross-section of approximately 4.4 mm² is to be obtained, the respective diameter of the nozzles will be 0.45, 0.63 and 0.89 mm, these nozzles being pierced in the plate 10 along tracks of diameter 22, 30 and 38 mm, that is to say the rotary circular distributor plates and the circular nozzle plates can have an outside diameter of approximately 45 to 50 mm, thus making it possible to produce a distributor of small bulk, the rotary part of which has a low inertia. Such a distributor is suitable for a total flow rate of approximately 30 liters per minute.

Figure 12:
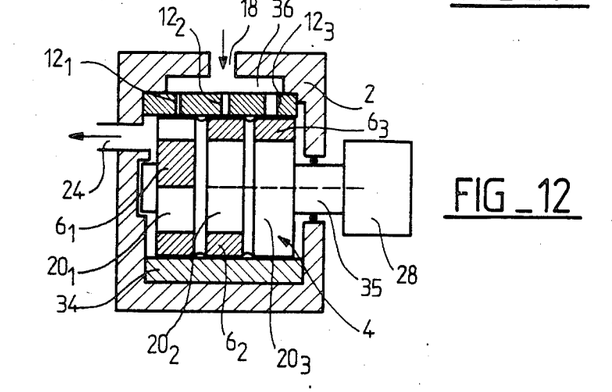
FIG. 12 is a sectional view of a distributor with a cylindrical rotary slide.

In an advantageous embodiment of the invention illustrated in FIG. 12, the movable distributor member 4 is a rotary member, but of cylindrical shape, which is driven in rotation in steps by means of a motor 28 within a tubular sleeve 34 integral with the body 2. The nozzles $12_1$, $12_2$, $12_3$ (of cross-section a, 2a, 4a) are pierced in the sleeve 34 and communicate with a groove 36 connected to the fluid inlet (or outlet) orifice 18.

The recesses $20_1$, $20_2$, $20_3$ are machined, along three tracks aligned with the three nozzles, on the cylindrical surface of the rotary distributor 4, the remaining portions of this surface constituting the shut-off zones $6_1$, $6_2$, $6_3$.

The extensions and positions of these recesses and shut-off zones correspond to the diagrams of FIGS. 3 and 4 which can be considered as laid-out views of the opposing cylindrical surfaces of the distributor member 4 and the sleeve 34. Preferably, instead of piercing the three (or more than three) nozzles on one and the same generating line of the sleeve 34, these nozzles are offset angularly (for example, by 120° or 90°), as described in relation to FIG. 6, to achieve at least partial hydrostatic balancing of the cylinder in the sleeve.

To ensure constant clearance between the cylinder and the sleeve and to limit the frictional forces, the shaft 35 carrying the cylinder 4 can be supported in the body 2 by two ball bearings (not shown).

FIG. 13 illustrates a distributor with a cylindrical rotary slide, that is to say of the type shown in FIG. 12, but constituting a "5/2" distributor as a result of the mechanical coupling of two identical portions of the rotary slide.

The fixed body 2 of the distributor is formed by a main tubular body 40 closed by two bottoms 42, 42'. The body is perforated with five fluid passage orifices 18 (high-pressure inlet), 18' and 18" (low-pressure outlet), 24 and 24' (service). To make the drawing clearer, the five orifices have been shown in one and the same diametral plane, but in actual fact they are arranged in different planes.

The nozzle sleeve 34 is mounted in the fixed body in a leak-proof and fixed manner and has four gaskets 44 delimiting three independent leak-proof annular chambers 46, 48, 50. The chamber 46 communicates with the high-pressure inlet 18 and the chambers 48, 50 communicate respectively with the service orifices 24, 24'. Two annular end chambers 52, 52' communicate respectively with the low-pressure outlets 18', 18".

The sleeve 34 is perforated with four groups, each consisting of a plurality of nozzles (for example, three) $12_1$, $12_2$, $12_3$, $12'_1$, $12'_2$, $12'_3$, $13_1$, $13_2$, $13_3$, $13'_1$, $13'_2$, $13'_3$ of increasing cross-sections a, 2a, 4a. Here again, the nozzles have been shown in one and the same diametral plane for the sake of clarity in the drawing, but they are offset angularly to ensure the hydrostatic balancing of the rotary slide 4, as will be seen in relation to FIG. 17.

Figure 14:
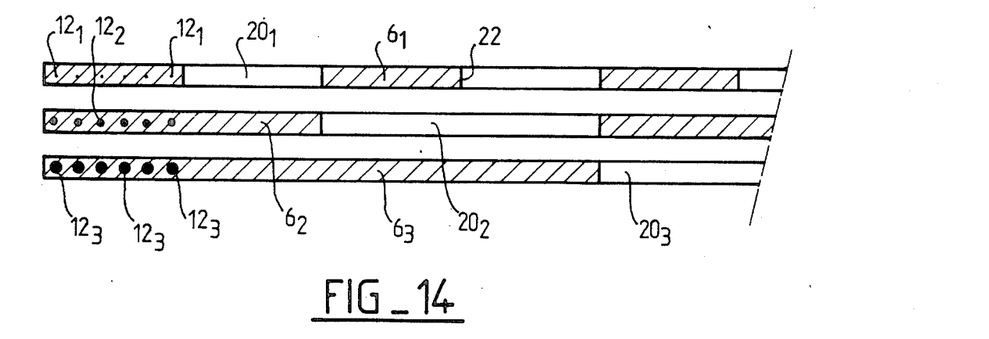
FIG. 14 is a partial laid-out view of the nozzle sleeve and the cylindrical rotary slide of the distributor of FIG. 13.

A plurality of nozzles of identical cross-section is pierced on each track of the sleeve 34 (as shown in FIG. 5 with four identical nozzles on each track), and these nozzles are offset by one increment. In the embodiment of FIG. 13, there can be six identical nozzles, as shown in FIG. 14 which is a partial laid-out view of the sleeve 34 and the shut-off zones and recesses of the slide 4 in line with the nozzles $12_1$, $12_2$, $12_3$. The arrangement with three tracks and six nozzles per track gives 42 positions, with the passage cross-sections a, 2a, 3a, ..., 40a, 41a, 42a.

The cylindrical rotary slide 4 is of tubular shape to reduce its inertia. It is driven in rotation step by step by a stepping motor 28, the shaft 38 driving the slide by means of a spindle 54. Ball bearings (not shown) can be provided at the ends of the slide to center the latter in the sleeve 34.

The outer cylindrical surface of the slide 4 is divided into four groups of three identical tracks, of which only the tracks $14_1$, $14_2$, $14_3$ interacting with the nozzles $12_1$, $12_2$, $12_3$ will be described. Each track is separated from the adjacent track by a groove 56. Between the two groups of three tracks of the right-hand half and the left-hand half of the slide, two continuous cylindrical collars 58, 58' without recesses slide in a leak-proof manner against the inner surface of the sleeve 34, to prevent any communication between two adjacent groups ($12_1$, $12_2$, $12_3$ and $13'_1$, $13'_2$, $13'_3$ on the one hand and $12'_1$, $12'_2$, $12'_3$ and $13_1$, $13_2$, $13_3$ on the other hand).

Figure 15:
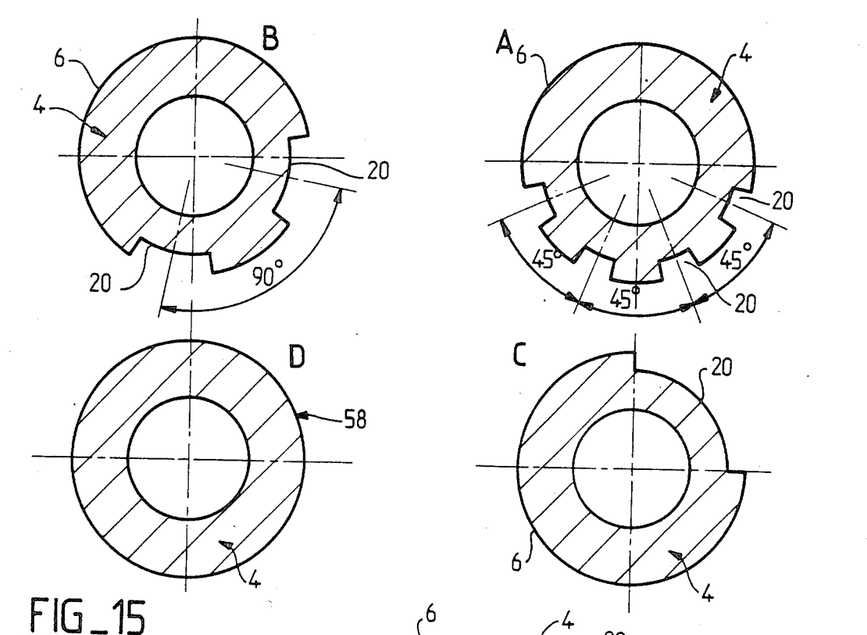
FIG. 15 is a sectional view in four planes ABCD of the slide of FIG. 13.

FIG. 15 shows sectional views of the slide 4 in the planes A, B, C, D of FIG. 13, to show the shut-off zones 6 of the nozzles and the recesses 20 on the three tracks $14_1$, $14_2$, $14_3$ as well as the continuous sealing zone 58 (plane D).

For the other three groups of tracks of the slide 4 the drawing of the shut-off zones and the recesses is identical, but with the desired angular offset to ensure the necessary hydraulic switching operations between the high-pressure, low-pressure and service orifices.

The sleeve 34 is perforated with a series of fluid passages between its outer surface and its inner volume: high-pressure passages 60 put the groove 46 of the sleeve in communication with a groove 62 cut in the central part of the slide 4, and low-pressure passages 64, 64' put annular end chambers 66, 66' surrounding the slide 4 in communication with the low-pressure chambers 52, 52' and the outlet orifices 18', 18".

To actuate the rotary slide of a distributor, such as that of FIG. 13 (with 42 positions in each operating direction, that is to say approximately over half a revolution), a stepping motor 28 giving 96 steps per revolution, that is to say an angular increment of 3.75°, can be used.

Figure 16:
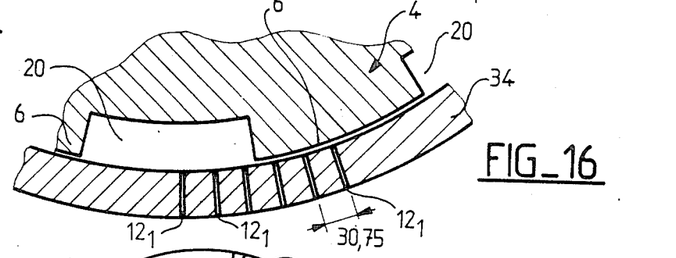
FIG. 16 is a partial sectional view of the nozzle sleeve and the slide of FIG. 13.

FIG. 16 shows a partial view of the sleeve 34 in the plane A of FIG. 13, showing the six nozzles $12_1$ of identical cross-section a, offset 3.75° on one and the same track, and showing a portion of the slide 4 with the shut-off zone 6 and the recesses 20 made in it.

As seen above, hydrostatic balancing of the slide 4 in the sleeve 34 is achieved completely or partially by means of a suitable angular offset of the opposing nozzles of the sleeve, allowing for the fact that the hydrostatic forces exerted on the distributor slide are proportional to the pressure difference and to the surface of the shut-off orifices.

Figure 17:
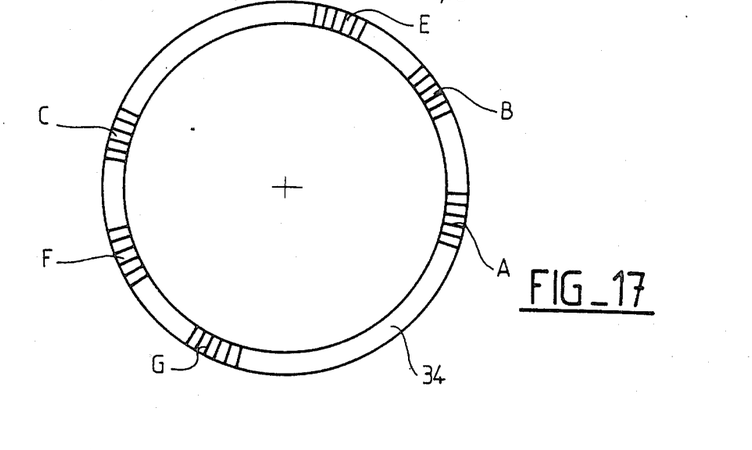
FIG. 17 is a sectional view showing the angular distribution of the nozzles in the nozzle sleeve.
Figure 18:
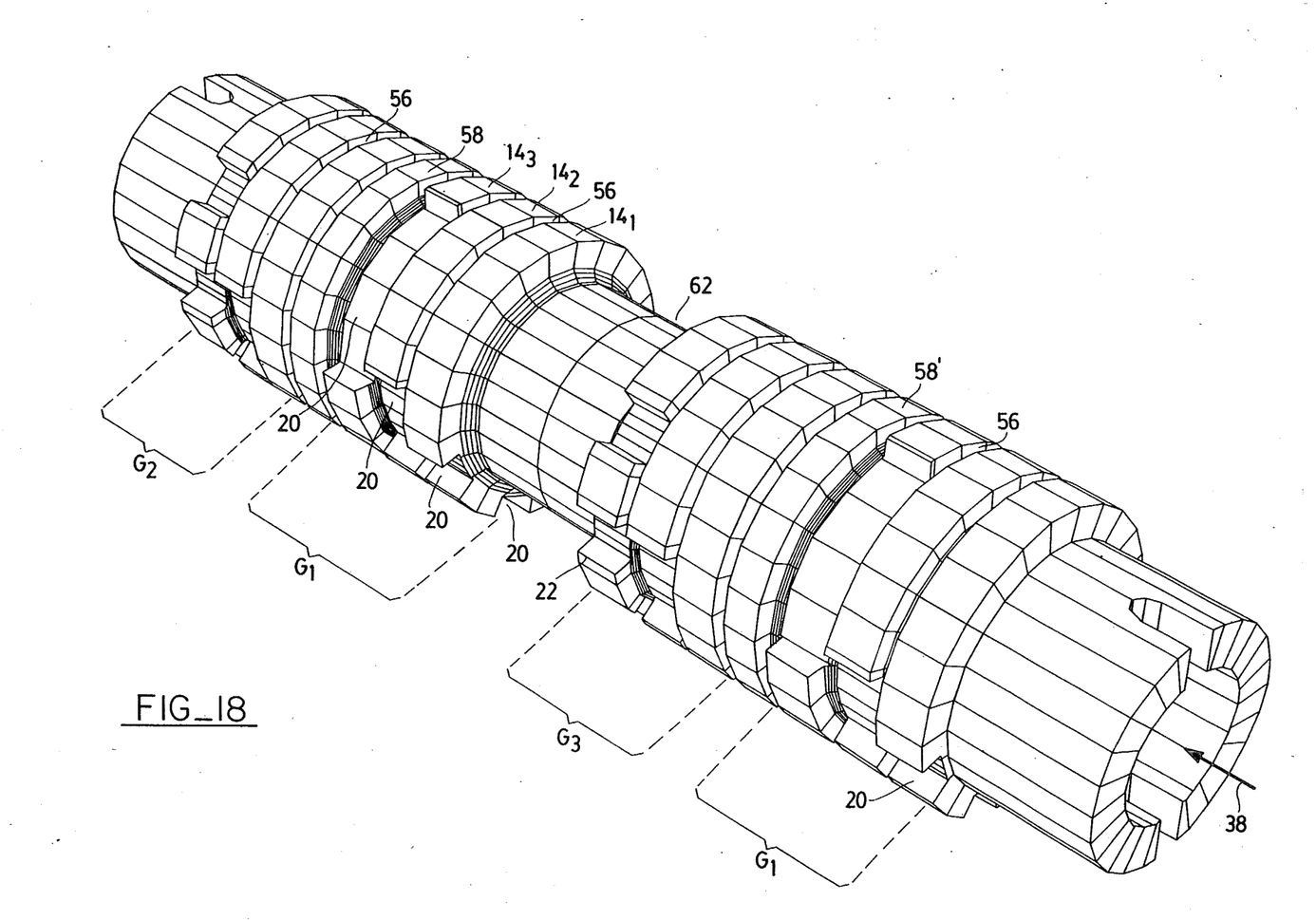

FIG. 17 shows by way of example the location on the sleeve 34 of each group of six nozzles of the same cross-section, in the planes A, B, C, F, G, H of FIG. 13, bearing in mind that the nozzles of cross-section a, 2a, 4a are arranged respectively on the tracks passing through the planes A, H-B, G-C, F. The angular offset of the groups of nozzles ensures the balancing of the slide in the sleeve.

To limit the inertia of the slide, it is given the smallest possible diameter. In this case, it may be advantageous to replace each orifice with a large flow cross-section 4a (such as $12_3$ in FIG. 13) by two orifices of cross-section 2a side by side and located on one and the same generating line of the sleeve, so as not to exceed the angular increment selected to achieve the intended resolution.

It emerges clearly from the foregoing that the distributor according to the invention makes it possible to vary the flow rate (or the pressure) in a strictly proportional manner as a function of the signal received, because the variations in fluid passage cross-section are effected as a result of the successive opening (or closing) of a plurality of distributors equivalent to all-or-nothing distributors.

The invention is used in a particularly appropriate way in a numerical control which controls the angular movements of the stepping drive motor. The distributor does not need a pilot stage, since the slide can be controlled directly by the step-by-step actuator, thus allowing reliable and inexpensive production.

I claim:

1. A proportional hydraulic distributor comprising a first and a second member, one of which is a fixed body and the other of which is a movable distributor member having a cylindrical surface in contact with a corresponding cylindrical surface of the fixed body, the first member possessing at least one hydraulic-fluid passage opening onto its surface, the second member possessing on its surface at least one zone shutting off the said passage and at least one recess forming a zone exposing the said orifice, and the said movable member being controlled by an actuating system, the said distributor being one in which at least one of the abovementioned passages consists of a plurality n of elementary orifices, or nozzles, which are pierced in the first member and are at a distance from one another and the total cross-section of which forms the cross-section of the said passage, in which the said nozzles are arranged on a plurality of parallel tracks directed parallel to the relative movement of the two members, each track possessing at least one nozzle, and the cross-section of the nozzles increases in the ratio a, 2a, 4a, 8a, and so on, from one track to the other, and the extension of the recesses and of the shut-off zones on the corresponding tracks of the second member is in the ratio d, 2d, 4d, 8d, and so on, in which the said actuating system is a step-by-step system driving the movable member in increments of value d, and in which the recesses and the shut-off zones provided on the second member are such that the said nozzles are exposed or shut off in turn at each advance of the movable member by one increment d.

2. A distributor as claimed in claim 1, wherein the nozzles (12) are pierced in a part (10) integral with the fixed body, and wherein the second member carrying the said shut-off zones and the said recesses is the movable member driven in steps by the actuator.

3. A distributor as claimed in claim 1, wherein the movable member executes a linear movement.

4. A distributor as claimed in claim 1, wherein the movable member executes a rotary movement.

5. A distributor as claimed in claim 1, wherein the movable distributor member is a slide (4, 32) of cylindrical shape, its cylindrical surface having the above-mentioned shut-off zones and recesses, wherein the nozzles (12) are pierced in a tubular sleeve (34) which is integral with the fixed body (2) and within which the said slide moves, and wherein the nozzles are arranged on a plurality of radii ($R_1$, $R_2$, $R_3$, etc.) offset equiangularly, the said offset nozzles ensuring at least partial hydrostatic balancing of the slide in the sleeve.

6. A distributor as claimed in claim 5 wherein the cylindrical slide (32) is a slide which slides linearly in steps in the sleeve (34).

7. A distributor as claimed in claim 5, wherein the cylindrical slide (4) is a rotary slide which pivots in steps in the sleeve (34).

8. A distributor as claimed in claim 1, which comprises at least two rotary movable distributor members (4, 4') keyed on one and the same shaft (38) driven by a rotary step-by-step actuator (28), each of the said members (4, 4') interacting with a group of nozzles ($12_1$, $12_2$, $12_3$, $12'_1$, $12'_2$, $12'_3$) pierced in at least one part (4, 4', 34) integral with the fixed body (2), each group of nozzles communicating respectively with a separate fluid passage (18, 18'), and each movable distributor member (4, 4') controlling the circulation of fluid to or from a separate fluid passage (24, 24').

9. A proportional hydraulic distributor comprising a first and a second member, one of which is a fixed body and the other of which is a rotationally movable distributor member having a cylindrical surface in contact with a cylindrical corresponding surface of the fixed body, the first member possessing at least one hydraulic-fluid passage opening onto its surface, the second member possessing on its surface at least one zone shutting off the said passage and at least one recess forming a zone exposing the said orifice, and the said movable member being controlled by an actuating system, the said distributor being one in which at least one of the above-mentioned passages consists of a plurality n of elementary orifices, or nozzles, which are pierced in the first member and are at a distance from one another and the total cross-section of which forms the cross-section of the said passage, in which the said nozzles are arranged on a plurality of parallel tracks directed parallel to the relative movement of the two members, each track possessing at least one nozzle, and the cross-section of the nozzles increases in the ratio a, 2a, 4a, 8a, and so on, from one track to the other, said distributor further comprising a plurality m of nozzles of identical cross-section pierced on each of the tracks, and the extensions of the recesses and of the shut-off zones on the corresponding tracks of the second member being equal to m×d, 2m×d, 4m×d, 8 m×d, and so on, in which the said actuating system is a step-by-step system rotationally driving the movable member in increments of value d, and in which the recesses and the shut-off zones provided on the second member are such that the said nozzles are exposed or shut off in turn at each rotational advance of the movable member by one increment d.

10. A proportional hydraulic distributor comprising a first and a second member, one of which is a fixed member and the other of which is a movable member having a cylindrical surface in contact with a corresponding cylindrical surface of said fixed member, said first member possessing at least one hydraulic-fluid passage opening onto its said cylindrical surface, said second member possessing on its said cylindrical surface at least one zone shutting off the said passage and at least one recess forming a zone exposing the said passage, and actuating means for controlling the movement of said movable member for incremental rotational movement about its axis, said distributor being one in which at least one of the above mentioned passages consists of a plurality (n) of elementary nozzles in the first member spaced from one another and the total cross-section of which forms the cross-section of the said passage, in which the said nozzles are arranged on a plurality of parallel tracks directed parallel to the relative rotational movement of said fixed and movable members, each track comprising at least one said nozzle, said actuating means being a step-by-step means for rotationally driving the movable member in increments of value (d), and in which the recesses and the shut-off zones provided on the second member are such that the said nozzles are exposed or shut off in turn at each advance of the movable member by one increment (d).

* * * * *

UNITED STATES PATENT AND TRADEMARK OFFICE
CERTIFICATE OF CORRECTION

PATENT NO. : 4,700,747
DATED : October 20, 1987
INVENTOR(S) : Claude Wartelle

It is certified that error appears in the above-identified patent and that said Letters Patent is hereby corrected as shown below:

Column 11, claim 8, line 9, delete "1" and substitute therefor --4--.

Signed and Sealed this

First Day of March, 1988

Attest:

DONALD J. QUIGG

Attesting Officer     Commissioner of Patents and Trademarks